United States Patent
Hassan et al.

(10) Patent No.: US 11,153,039 B2
(45) Date of Patent: Oct. 19, 2021

(54) DATA TRANSMISSION USING PUNCTURING AND ERROR CORRECTION ENCODING

(71) Applicant: Microsoft Technology Licensing, LLC, Redmond, WA (US)

(72) Inventors: Amer Aref Hassan, Kirkland, WA (US); Edward C. Giaimo, III, Bellevue, WA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/514,778

(22) Filed: Jul. 17, 2019

(65) Prior Publication Data

US 2021/0021372 A1 Jan. 21, 2021

(51) Int. Cl.
*H04L 1/00* (2006.01)
*H04L 1/20* (2006.01)
*H04L 29/08* (2006.01)
*H04L 7/04* (2006.01)

(52) U.S. Cl.
CPC .......... *H04L 1/0068* (2013.01); *H04L 1/0048* (2013.01); *H04L 1/203* (2013.01); *H04L 7/042* (2013.01); *H04L 67/12* (2013.01)

(58) Field of Classification Search
CPC ..... H04L 1/0068; H04L 7/042; H04L 1/0048; H04L 1/203; H04L 67/12; H04L 1/0045
See application file for complete search history.

(56) References Cited

U.S. PATENT DOCUMENTS

| 6,081,570 A | * | 6/2000 | Ghuman | ............... | H04J 3/0605 |
| | | | | | 370/514 |
| 2006/0294392 A1 | | 12/2006 | Veprek et al. | | |
| 2007/0127458 A1 | | 6/2007 | Small et al. | | |

(Continued)

FOREIGN PATENT DOCUMENTS

EP         1050986 A2        11/2000

OTHER PUBLICATIONS

Kaiser, et al., "Undetected Errors in Quasi-Cyclic LDPC Codes Caused by Receiver Symbol Slips", In Proceedings of IEEE Global Telecommunications Conference, Nov. 30, 2009, 6 Pages.

(Continued)

*Primary Examiner* — Moo Jeong
(74) *Attorney, Agent, or Firm* — Schwegman Lundberg & Woessner, P.A.

(57) ABSTRACT

Disclosed are systems, methods, and non-transitory computer-readable media for improved data transmissions using puncturing and error correction encoding. A decoder receives an encoded data input that includes a set of individual values. The decoder performing a puncturing of the encoded data input, yielding a punctured encoded data input that includes a subset of the individual values from the set of individual values. The decoder determines whether the punctured encoded data input maps to any predetermined data outputs from a set of predetermined data outputs, and in response to determining that the punctured encoded data input maps to a predetermined data output from the set of predetermined data outputs, the decoder determines that the encoded data input corresponds to the predetermined data output.

19 Claims, 7 Drawing Sheets

(56) References Cited

U.S. PATENT DOCUMENTS

| | | | |
|---|---|---|---|
| 2012/0317464 A1* | 12/2012 | Yoshiyama | H04L 7/042 |
| | | | 714/799 |
| 2013/0238903 A1 | 9/2013 | Mizunuma | |
| 2018/0159679 A1* | 6/2018 | de Ruijter | H04J 3/0658 |
| 2019/0103955 A1* | 4/2019 | Lee | H04L 5/26 |
| 2021/0021420 A1 | 1/2021 | Hassan et al. | |

OTHER PUBLICATIONS

"International Search Report and Written Opinion Issued in PCT Application No. PCT/US20/033474", dated Aug. 11, 2020, 11 Pages.

Chatterjee, et al., "The TypTop System: Personalized Typo-Tolerant Password Checking", In Proceedings of the ACM SIGSAC Conference on Computer and Communications Security, Oct. 30, 2017, pp. 1-20.

"International Search Report and Written Opinion issued in PCT Application No. PCT/US20/033475", dated Aug. 28, 2020, 11 Pages.

Alghathbar, et al., "Noisy Password Scheme: A New One Time Password System", In Proceedings of Canadian Conference on Electrical and Computer Engineering, May 3, 2009, pp. 841-846.

"Non Final Office Action Issued in U.S. Appl. No. 16/514,747", dated Jul. 8, 2021, 13 Pages.

\* cited by examiner

DATA TRANSMISSION USING PUNCTURING AND ERROR CORRECTION ENCODING

TECHNICAL FIELD

An embodiment of the present subject matter relates generally to data transmissions and, more specifically, to improved data transmissions using puncturing and error correction encoding.

BACKGROUND

Many communication channels are subject to channel noise, which causes errors to occur when transmitting digital data between devices. An error may cause the data received by a receiving device to be different than the data that was transmitted by the transmitting device. Redundancy techniques, such as forward error correction (FEC), are used to correct errors during transmission. For example, the data is encoded prior to transmission to add redundancy. The receiving device uses a decoder to decode the encoded data into its original format. In some instances, however, a decoder may not be able to decode the encoded data. Current systems either skip this input (e.g., do not decode the data) or request that the data be retransmitted. These solutions are not optimal as they result in lower quality output or increased latency. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
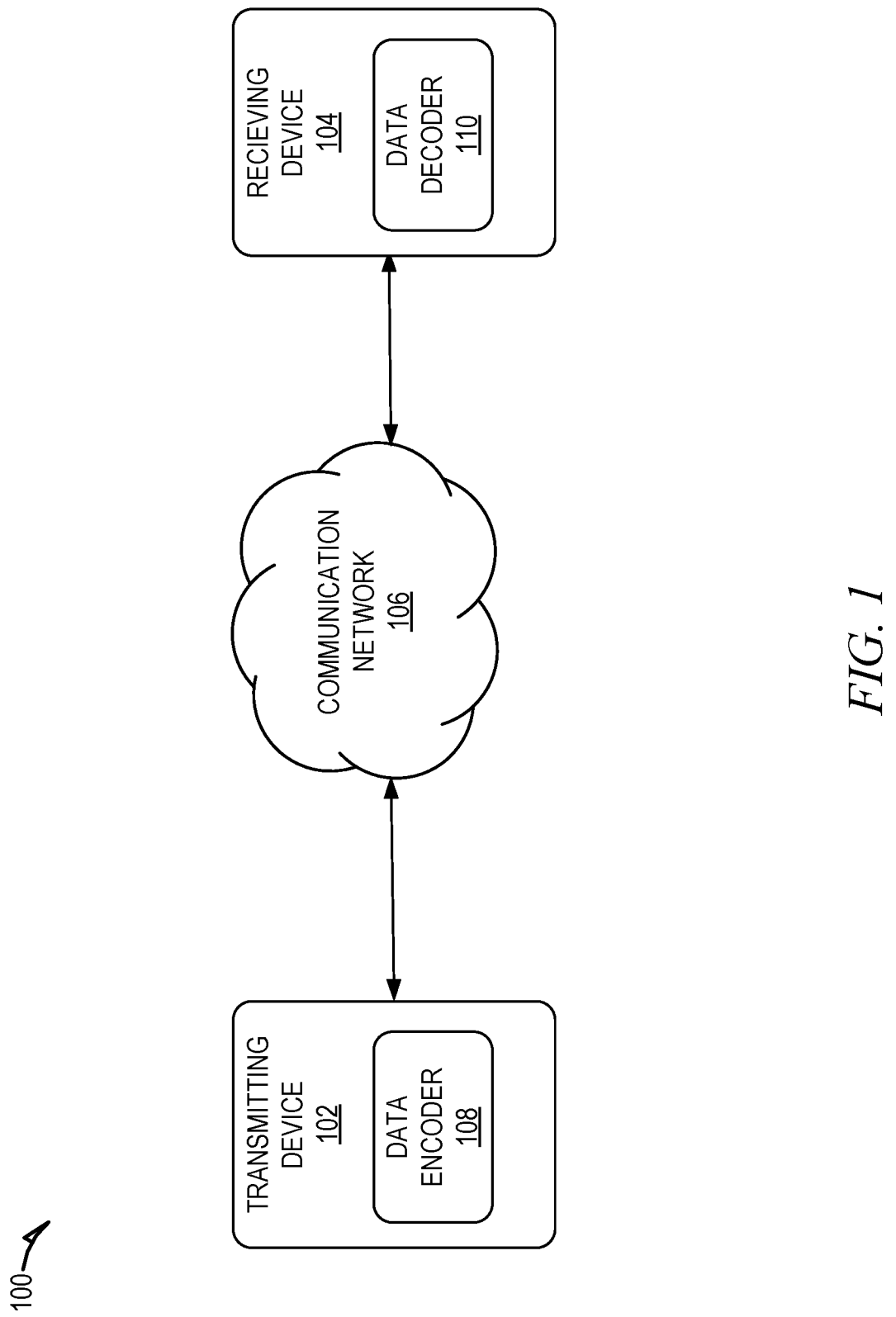
FIG. 1 is a block diagram illustrating an example system for improved data transmissions using puncturing and error correction encoding, in accordance with some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for improved data transmissions using puncturing and error correction encoding. Error correction encoding, such as forward error correction (FEC), encodes data to provide redundancy to the data prior to transmission. The redundant data added to the data input can be used by the receiving device to correct errors that occur during transmission. That is, the redundant data allows a data decoder of the receiving device to properly map the received encoded data input to is corresponding data output.

A data input is an ordered set of individual values, such as a binary number made up of an ordered set of zeroes and ones (e.g., 0001, 0010, etc.). The data encoder at a transmitting device uses error correction encoding to encode a data input prior to transmission by adding redundancy to the data input, such as by repeating some or all of the individual values included in the data input. The resulting encoded data input is an ordered set of individual values that includes more individual values than the original data input. For example, the encoder may encode the data input 0001 into multiple data blocks that repeat the complete ordered set of individual values (e.g., 0001 0001 0001 0001) or data blocks that repeat each individual value from the data input (e.g., 0000 0000 0000 1111).

In the event an error occurs during transmission of the encoded data input (e.g., the encoded data input received by the receiving device does not match the encoded data input transmitted by the transmitting device), the added redundant data allows the data decoder to properly map the encoded data input to its corresponding data output. For example, if an error occurs during transmission and one the data blocks in the encoded data input is received incorrectly (e.g., 0110 0001 0001 0001), the data decoder can determine that the received encoded data input maps to the data output 0001 because the majority of the data block in the encoded data input are 0001.

In some cases, an error may result in one or more individual values being added or removed from the encoded data input (e.g., a bit slip) during transmission. As a result, the number of individual values received by the receiving device may be greater or less than the number of individual values transmitted by the transmitting device. This may cause an issue as the data decoder may be configured to decode an encoded data input that includes up to a maximum number of individual values (e.g., the data decoder cannot decode the received encoded data input). For example, when synchronizing data received from an Internet of Things (IoT) device, the receiving device may be searching for a sequence of values of a certain size in the data stream to synchronize the data transmissions. For example, the sequence of values may identify the device that transmitted the data. If the encoded data input includes more data values than expected (e.g., one or more data values were added), the data decoder may not be able to properly map the received encoded data input to a data output.

Rather than skipping a received encoded data input that includes more than this threshold number of values or requesting that the encoded data input be retransmitted by the transmitting device, the data decoder punctures the encoded data input to reduce the number of individual values in the encoded data input to a number of individual values that is no greater than the threshold value. Puncturing the encoded data input includes removing one or more of the individual values included in the encoded data input. For example, an encoded data input that includes seventeen individual values may be punctured to remove one or more of the individual values, resulting in a punctured encoded data input that includes sixteen or less individual values.

The data decoder attempts to map the punctured encoded data input to a corresponding data output from a set of predetermined data outputs. Each predetermined data output is an ordered set of individual values, although the number of individual values included in the data output is less than the number of individual values included in the encoded data input. The data decoder may repeat this process of puncturing and mapping by removing different individual values from the encoded data input until the resulting punctured encoded data input can be successfully mapped to one of the data outputs or until a threshold period of time has elapsed (e.g., a timeout occurs).

In some examples, when puncturing an encoded data input, the data decoder selects the individual values to remove from the encoded data input at random. That is, the individual value or values that are removed from the ordered set of values of the encoded data input is selected randomly to generate the punctured encoded data input. As another example, the data decoder may select the individual values to remove based on a predetermined order. For example, the data decoder may maintain a listing of selections to be performed to generate a punctured encoded data input. The data decoder may therefore select the individual values based in the listing of selections. Using a listing of selections ensures that the same individual value or combination of individual values is not selected more than once.

In some embodiments, the number of individual values removed may be based on the threshold number of values that the data decoder is configured to decode. For example, the number of individual values removed from the encoded data input by the data decoder results in a punctured encoded data input with a number of individual values that is no greater than the threshold number of values.

The data decoder may repeat the process of puncturing the encoded data input and attempting to map the resulting punctured encoded data input to a data output multiple times (e.g., until the resulting punctured encoded data input can be successfully mapped a data output and/or until a threshold period of time has elapsed). Additionally, the data decoder may perform this process sequentially or in parallel. For example, the data decoder may perform the puncturing/mapping process sequentially such that the puncturing/mapping process is repeated in response to determining that a previously punctured encoded data cannot be mapped to any of the data outputs. Alternatively, the puncturing/mapping process may be performed concurrently such that the data decoder generates multiple punctured encoded data inputs from an encoded data input and/or attempts to map the multiple punctured encoded data inputs to a data output at least partially at the same time.

FIG. 1 is a block diagram illustrating an example system 100 for improved data transmissions using puncturing and error correction encoding, in accordance with some example embodiments. As shown, the system 100 includes a transmitting device 102 and a receiving device 104 connected to a communication network 106 and configured to communicate with each other through use of the communication network 106. The communication network 106 is any type of network, including a local area network (LAN), such as an intranet, a wide area network (WAN), such as the internet, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC), or an Internet of Things (Iot) device, such as a sensor, wearable, smart meter, etc. A computing device can include some or all of the features, components, and peripherals of the machine 700 shown in FIG. 7.

To facilitate communication with other computing devices, a computing device may include a communication interface configured to receive a communication, such as a request, data, and the like, from another computing device in network communication with the computing device and pass the communication along to an appropriate module running on the computing device. The communication interface also sends a communication to another computing device in network communication with the computing device.

The transmitting device 102 transmits digital data to the receiving device 104 via the communication network 106. For example, the transmitting device 102 may be an IoT device, such as a smart meter, that transmits data to the receiving device 104, which is an access point or controller. Although the transmitting device 102 and the receiving device 104 are shown as two separate types of entities, this is just for ease of explanation and not meant to be limiting. In some embodiments, the transmitting device 102 may also be a receiving device that receives data from other transmitting devices. Likewise, the receiving device 104 may be a transmitting device that transmits data to other receiving devices. Although the shown system 100 includes only one transmitting device 102 and one receiving device 104, this is also not meant to be limiting. One skilled in the art would appreciate that the system 100 can include any number of transmitting devices 102 and receiving devices 104. Accordingly, both the transmitting device 102 and the receiving device 104 may concurrently accept connections from and interact with any number of other transmitting and receiving devices. Hence, the transmitting device 102 and receiving device 104 may be of varying type, capabilities, operating systems, and so forth.

As shown, the transmitting device 102 includes a data encoder 108 and the receiving device 104 includes a data decoder 110. The data encoder 108 is a device or program implemented on the transmitting device 102 that converts data from its original format into another format (e.g., encodes a data input into an encoded data input) prior to transmission from the transmitting device 102 to the receiving device 104. The data decoder 110 is a device or program implemented on the receiving device 104 that translates an encoded data input into its original format (e.g., decodes the encoded data input). For example, the data decoder 110 receives and encoded data input and maps the encoded data input to its corresponding data output.

The data encoder 108 uses error correction encoding, such as forward error correction (FEC), to provide redundancy to a data input prior to transmission of the data input from the transmitting device 102 to the receiving device 104. The redundant data added to the data input allows the data decoder 110 of the receiving device 104 to correct errors that may have occurred during transmission. That is, the redundant data allows the data decoder 110 of the receiving device 104 to properly map the received encoded data input to is corresponding data output when an error occurs during transmission.

A data input is an ordered set of individual values, such as a binary number made up of an ordered set of zeroes and ones (e.g., 0001, 0010, etc.). The data encoder 108 at the transmitting device 102 uses error correction encoding to encode a data input prior to transmission by adding redundancy to the data input. For example, the data encoder 108 adds redundancy by repeating some or all of the individual values included in the data input. The resulting encoded data input is a different ordered set of individual values than the original data input, and the encoded data input includes more individual values than the original data input. For example, the data encoder 108 may encode the data input 0001 into multiple data blocks that repeat the complete ordered set of individual values (e.g., 0001 0001 0001 0001) or data blocks that repeat each individual value from the data input (e.g., 0000 0000 0000 1111).

In the event an error occurs during transmission of the encoded data input from the transmitting device 102 to the receiving device 104 (e.g., the encoded data input received by the receiving device 104 does not match the encoded data input transmitted by the transmitting device 102), the added redundant data allows the data decoder 110 to properly map the encoded data input to its corresponding data output. For example, if an error occurs during transmission and one the data blocks in the encoded data input is received incorrectly (e.g., 0110 0001 0001 0001), the data decoder 110 can determine that the received encoded data input maps to the data output 0001 because the majority of the data block in the encoded data input are 0001.

As shown in this example, mapping the encoded data input to its data output is not dependent on a perfect matching of each data block in the encoded data input to the data output. Rather, the data decoder 110 may map the encoded data input to the output based on a similarity metric exceeding a threshold similarity value. The similarity metric may indicate a level of similarity between the encoded data input and the data output. the data decoder 110 compares this similarity metric to the threshold similarity value to determine whether the encoded data input maps to the data output. For example, the data decoder determines that the encoded data input maps to the data output when the similarity metric meets or exceeds the threshold similarity value. Alternatively, the data decoder 110 determines that the encoded data input does not map to the data output if the similarity metric is below the threshold similarity value.

In some cases, an error during transmission may result in one or more individual values being added or removed from the encoded data input (e.g., a bit slip). As a result, the number of individual values received by the receiving device 104 may be greater or less than the number of individual values transmitted by the transmitting device 102. This may cause an issue as the data decoder 110 may be configured to decode an encoded data input that includes up to a maximum number of individual values (e.g., the data decoder 110 cannot decode the received encoded data input because it has too many individual values). For example, when synchronizing data received from a transmitting device 102, such as an Internet of Things (IoT) device, the data decoder 110 of the receiving device 104 may be searching for a specified sequence of values of a certain size in the data stream to synchronize the data transmissions. If the encoded data input includes more data values than expected (e.g., one or more data values were added), the data decoder 110 may not be able to properly map the received encoded data input to a data output.

Rather than skipping a received encoded data input that includes more than this threshold number of values or requesting that the encoded data input be retransmitted by the transmitting device 102, the data decoder 110 punctures the encoded data input to reduce the number of individual values in the encoded data input to a number of individual values that is no greater than the threshold value. Puncturing the encoded data input includes removing one or more of the individual values included in the encoded data input. For example, an encoded data input that includes seventeen individual values may be punctured to remove one or more of the individual values, resulting in a punctured encoded data input that includes sixteen or less individual values.

The data decoder 110 attempts to map the punctured encoded data input to a corresponding data output from a set of predetermined data outputs. Each predetermined data output is an ordered set of individual values, although the number of individual values included in the data output is less than the number of individual values included in the encoded data input. The data decoder 110 may repeat this process of puncturing and mapping by removing different individual values from the encoded data input until the resulting punctured encoded data input can be successfully mapped to one of the data outputs or until a threshold period of time has elapsed (e.g., a timeout occurs). In some examples, the data outputs may include one or more synchronization sequences or codes.

When puncturing an encoded data input, the data decoder 110 selects the individual values to remove from the encoded data input at random. That is, the individual value or values that are removed from the ordered set of values of the encoded data input is selected by the data decoder 110 randomly to generate the punctured encoded data input. In some embodiments, the number of individual values removed by the data decoder 110 may be based on the threshold number of values that the data decoder 110 is configured to decode. For example, the number of individual values removed from the encoded data input by the data decoder 110 results in a punctured encoded data input with a number of individual values that is no greater than the threshold number of values.

The data decoder 110 may repeat the process of puncturing the encoded data input and attempting to map the resulting punctured encoded data input to a data output multiple times (e.g., until the resulting punctured encoded data input can be successfully mapped a data output and/or until a threshold period of time has elapsed). Additionally, the data decoder 110 may perform this process sequentially or in parallel. For example, the data decoder 110 may perform the puncturing/mapping process sequentially such that the puncturing/mapping process is repeated in response to determining that a previously punctured encoded data cannot be mapped to any of the data outputs. Alternatively, the puncturing/mapping process may be performed concurrently such that the data decoder 110 generates multiple punctured encoded data inputs from an encoded data input and/or attempts to map the multiple punctured encoded data inputs to a data output at least partially at the same time. In some examples, the puncturing continues until a threshold time period has elapsed or until a match is found.

Figure 2:
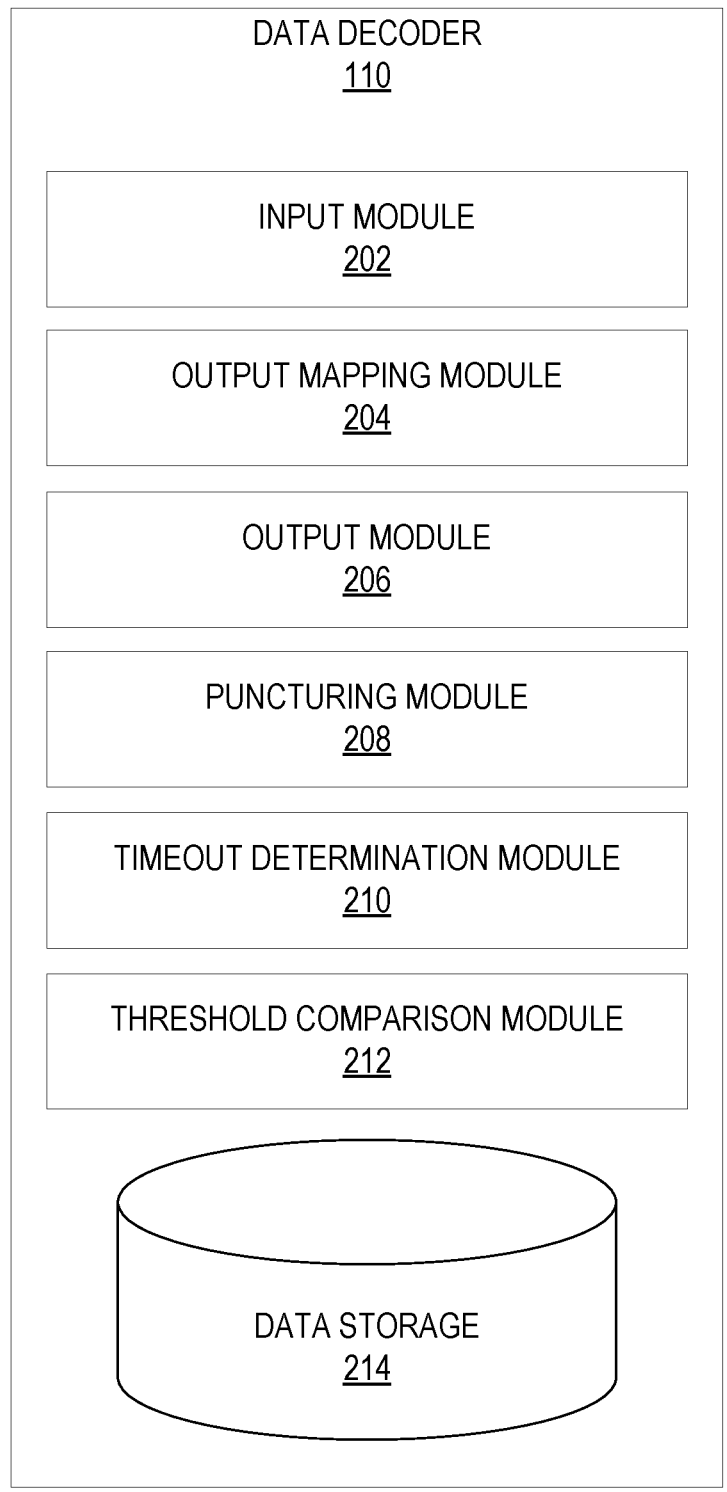
FIG. 2. is a block diagram of a data decoder, according to some example embodiments.

FIG. 2 is a block diagram of a data decoder 110, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the data decoder 110 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the data decoder 110 includes an input module 202, an output mapping module 204, an output module 206, a puncturing module 208, a timeout determination module 210, a threshold comparison module 212, and a data storage 214.

The input module 202 receives an encoded data input from the transmitting device 102 to be decoded by the data decoder 110. The encoded data input is encoded by a data encoder 108 at the transmitting device 102 prior to transmission to the receiving device 104. The data encoder uses error correction encoding (e.g., FEC) to add redundancy to the data input. For example, the data encoder 108 may add redundancy by repeating some or all of the individual values included in the data input. The resulting encoded data input is an ordered set of individual values that includes more individual values than the original data input. For example, the data encoder 108 may encode the data input 0001 into multiple data blocks that repeat the complete ordered set of individual values (e.g., 0001 0001 0001 0001) or data blocks that repeat each individual value from the data input (e.g., 0000 0000 0000 1111).

The redundant data added to the data input can be used by the data decoder 110 of the receiving device 104 to correct errors to the transmitted encoded data input that may have occurred during transmission. That is, the redundant data allows the data decoder 110 of the receiving device 104 to properly map the received encoded data input to is corresponding data output.

The output mapping module 204 attempts to map a received encoded data input to one of a set of predetermined data outputs. For example, each predetermined data output may be a distinctive bit sequence or sync word used to synchronize data transmissions received from a transmitting device 102 (e.g., IoT device). The output mapping module 204 may map the encoded data input to one of the predetermined data outputs using a known decoding technique, such as an FEC decoding technique. For example, the data encoder 108 may use any of a variety of error correction encoding techniques to encode a data input prior to transmission to the receiving device 104. The output mapping module 204 may use the decoding technique that corresponds to the error correction encoding technique used by the data encoder 108.

In some cases, the output mapping module 204 may not be able to successfully map the encoded data input to one of the predetermined data outputs. For example, the encoded data input that the output mapping module 204 is attempting to map to a predetermined data output may not match the encoded data input that was generated by the data encoder 108 of the transmitting device 102. In this type of situation, the output mapping module 204 may return an error, move on to a subsequent encoded data input, and/or request that the transmitting device 102 retransmit the encoded data input.

Alternatively, in the event that the output mapping module 204 is able to successfully map the encoded data input to one of the predetermined data outputs, the output mapping module 204 returns the predetermined data output. For example, the output mapping module 204 provides the predetermined data output to the output module 206, which may output the predetermined data output in a desired manner. For example, the output module 206 writes the predetermined data output to the data storage 214, transmits the predetermined data output to another device, performs a specified action based on the predetermined data output, etc.

In some cases, an error that occurs during transmission of an encoded data input may result in the output mapping module 204 not being able to even attempt to map the encoded data input to one of the predetermined data outputs. For example, an error may occur that results in one or more additional individual values being added to the encoded data input. As a result, the number of individual values received by the receiving device 104 is greater than the number of individual values transmitted by the transmitting device 12. This causes an issue then the data decoder 110 is configured to decode an encoded data input that includes up to a maximum number of individual values (e.g., the data decoder cannot decode the received encoded data input).

Rather than skipping a received encoded data input that includes more than the threshold number of values or requesting that the encoded data input be retransmitted by the transmitting device 102, the data decoder 110 may attempt to remedy the error and map the encoded data input one of the predetermined data outputs. For example, the puncturing module 208 punctures the encoded data input to reduce the number of individual values in the encoded data input to a number of individual values that is no greater than the threshold value. Puncturing the encoded data input includes removing one or more of the individual values included in the encoded data input. For example, an encoded data input that includes seventeen individual values may be punctured by the puncturing module 208 to remove one or more of the individual values, resulting in a punctured encoded data input that includes sixteen or less individual values.

The puncturing module 208 may provide the punctured encoded data input to the output mapping module 204, which attempts to map the punctured encoded data input to one of the predetermined data outputs. The puncturing module 208 may repeat this process of puncturing the encoded data input until a resulting punctured encoded data input is successfully mapped to a data output by the output mapping module 204. For example, the puncturing module 208 may generate multiple versions of a punctured encoded data input from an encoded data input by removing different individual values from the encoded data input.

The puncturing module 208 may provide these varying versions of the punctured encoded data input to the output mapping module 204 until a punctured encoded data input can be successfully mapped to one of the data outputs or until a threshold period of time has elapsed (e.g., a timeout occurs). For example, the timeout determination module 210 determines whether the threshold period of time has elapsed without the encoded data input being successfully mapped to a predetermined data output. In the event that the threshold period of time has elapsed, the timeout determination module 210 causes the data decoder 110 to stop the process of modifying the encoded data input.

In some embodiments, the puncturing module 208 selects the individual values to remove from the encoded data input at random. That is, the individual value or values that are removed from the ordered set of values of the encoded data input is selected by the puncturing module 208 randomly to generate the punctured encoded data input.

As another example, the puncturing module 208 may select the individual values to remove based on a predetermined order. For example, the puncturing module 208 may maintain a listing of selections to be performed to generate a punctured encoded data input. The puncturing module 208 may therefore select the individual values based in the listing of selections. Using a listing of selections ensures that the same individual value or combination of individual values is not selected more than once.

As explained earlier, the puncturing module 208 and output mapping module 204 may repeat the process of puncturing an encoded data input and attempting to map the resulting punctured encoded data input to a predetermined data out until one of punctured encoded data input can is successfully mapped to one of the data outputs or until a threshold period of time has elapsed (e.g., a timeout occurs). This process may be performed sequentially or in parallel. For example, the puncturing module 208 and output mapping module 204 may perform the puncturing/mapping process sequentially such that the puncturing/mapping process is repeated after determining that a previously punctured encoded data cannot be mapped to any of the data outputs. Alternatively, the puncturing/mapping process may be performed concurrently such that the puncturing module 208 generates multiple punctured encoded data inputs from an encoded data input and/or the output mapping module 204 attempts to map the multiple punctured encoded data inputs one of the predetermined data output at least partially at the same time.

In some embodiments, the puncturing module 208 performs the puncturing process on each encoded data input received from the transmitting device 102. Alternatively, the puncturing module 208 performs the puncturing process on encoded data inputs if the number of individual values included in the encoded data input is greater than a threshold number of values that the data decoder 110 is configured to decode. For example, the threshold comparison module 212 may determine a number of individual values in an encoded data input received by the data decoder 110 and compare the number to the threshold value. In the event that the number of individual values in the encoded data input is greater than the threshold value, the threshold comparison module 212 may provide the encoded data input to the puncturing module 208 to be punctures.

In some embodiments, the number of individual values removed from the encoded data input by the puncturing module 208 may be based on the threshold number of values that the data decoder 110 is configured to decode. For example, the number of individual values removed from the encoded data input by the puncturing module 208 may vary to result in a punctured encoded data input with a number of individual values that is no greater than the threshold number of values.

Figure 3:
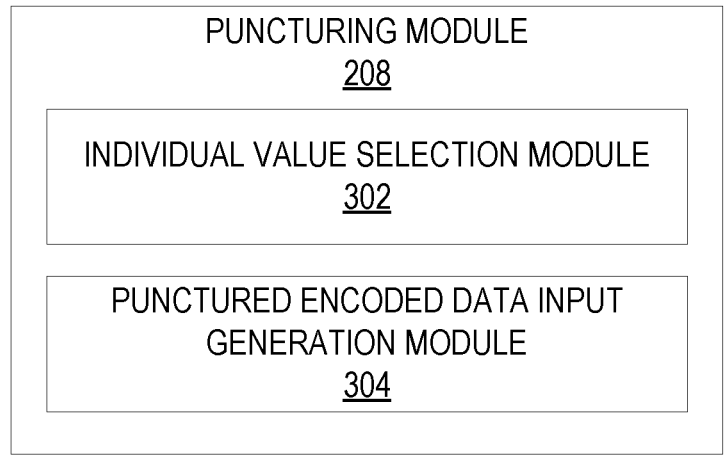
FIG. 3 is a block diagram of a puncturing module, according to some example embodiments.

FIG. 3 is a block diagram of a puncturing module 208, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the puncturing module 208 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the puncturing module 208 includes an individual value selection module 302 and a punctured encoded data input generation module 304. The individual value selection module 302 selects the individual values to be removed from an encoded data input. The individual value selection module 302 may select the individual values to remove at random. For example, the individual value selection module 302 randomly selects one or more values from the ordered set of values to be removed from the encoded data input. The number of individual values selected by the individual value selection module 302 may be based on the threshold number of values that the data decoder 110 is configured to decode. For example, the number of individual values selected by the individual value selection module 302 may vary to result in a punctured encoded data input with a number of individual values that is no greater than the threshold number of values.

In some embodiments, the individual value selection module 302 may maintain a log of the previously selected individual values or combination of individual to ensure that the same individual value or combination of individual values is not selected more than once for a given encoded data input.

The punctured encoded data input generation module 304 generates a punctured encoded data input based on the individual values selected by the individual value selection module 302. For example, the punctured encoded data input generation module 304 generates a punctured encoded data input that does not include the individual values selected by the individual value selection module 302. The resulting punctured encoded data input therefore includes a subset of the individual values from the encoded data input.

Figure 4:
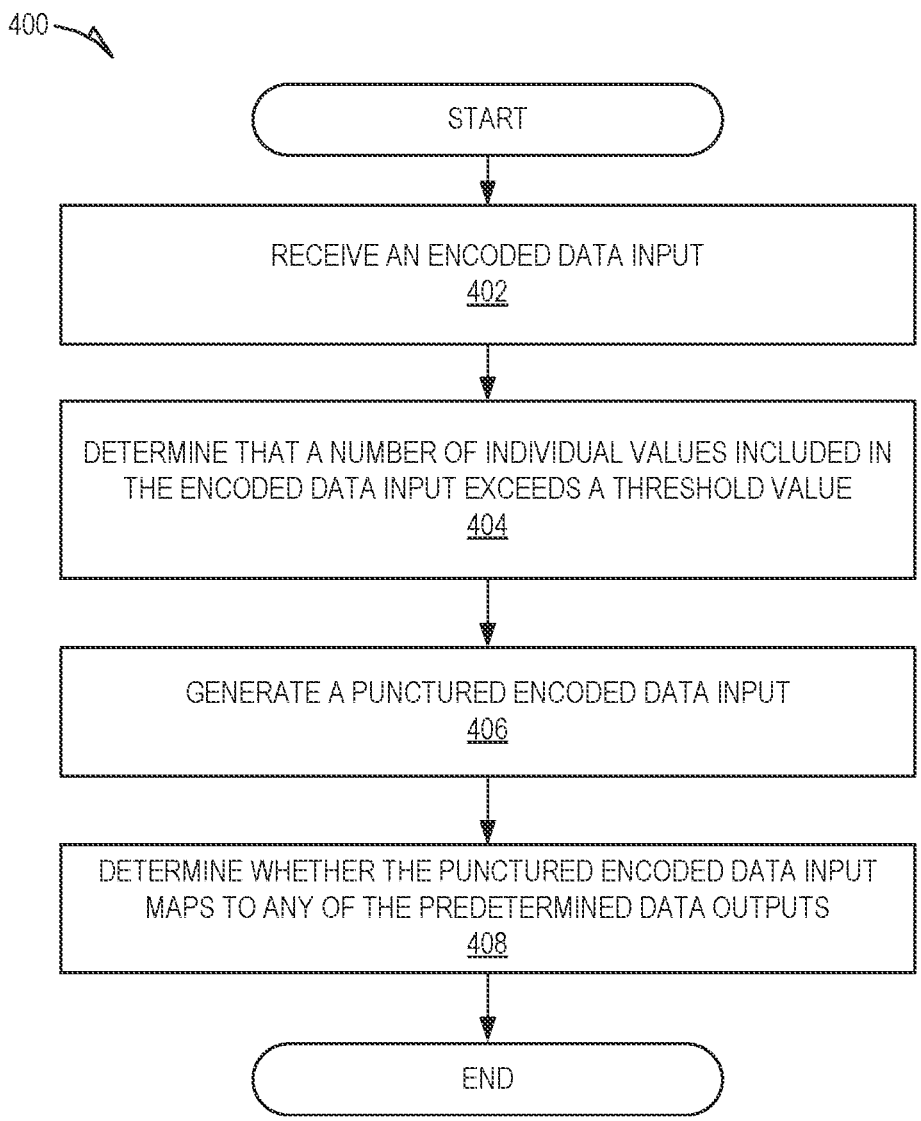
FIG. 4 is a flowchart showing an example method for improved data transmissions using puncturing and error correction encoding, according to certain example embodiments.

FIG. 4 is a flowchart showing an example method 400 for improved data transmissions using puncturing and error correction encoding, according to certain example embodiments. The method 400 may be embodied in computer readable instructions for execution by one or more processors such that the operations of the method 400 may be performed in part or in whole by the data decoder 110; accordingly, the method 400 is described below by way of example with reference thereto. However, it shall be appreciated that at least some of the operations of the method 400 may be deployed on various other hardware configurations and the method 400 is not intended to be limited to the data decoder 110.

At operation 402, the input module 202 receives an encoded data input. The input module 202 receives the encoded data input from the transmitting device 102. The encoded data input is encoded by a data encoder 108 at the transmitting device 102 prior to transmission to the receiving device 104. The data encoder uses error correction encoding (e.g., FEC) to add redundancy to the data input. For example, the data encoder 108 may add redundancy by repeating some or all of the individual values included in the data input. The resulting encoded data input is an ordered set of individual values that includes more individual values than the original data input.

At operation 404, the threshold comparison module 212 determines that a number of individual values included in the encoded data input exceeds a threshold value. For example, the threshold comparison module 212 determines a number of individual values in an encoded data input received by the data decoder 110 and compares the number of individual values in an encoded data input to the threshold value.

At operation 406, the puncturing module 208 generates a punctured encoded data input. For example, the puncturing module 208 punctures the encoded data input to reduce the number of individual values in the encoded data input to a number of individual values that is no greater than the threshold value. Puncturing the encoded data input includes removing one or more of the individual values included in the encoded data input. Accordingly, the punctured encoded data input includes a subset of the individual values from the encoded data input.

At operation 408, the output mapping module 204 determines whether the punctured encoded data input maps to any of the predetermined data outputs. For example, each predetermined data output may be a distinctive bit sequence or sync word used to synchronize data transmissions received from a transmitting device 102 (e.g., IoT device). The output mapping module 204 may attempt to map the punctured encoded data input to one of the predetermined data outputs using a known decoding technique, such as an FEC decoding technique. For example, the data encoder 108 may use any of a variety of error correction encoding techniques to encode a data input prior to transmission to the receiving device 104. The output mapping module 204 may use the decoding technique that corresponds to the error correction encoding technique used by the data encoder 108.

Figure 5:
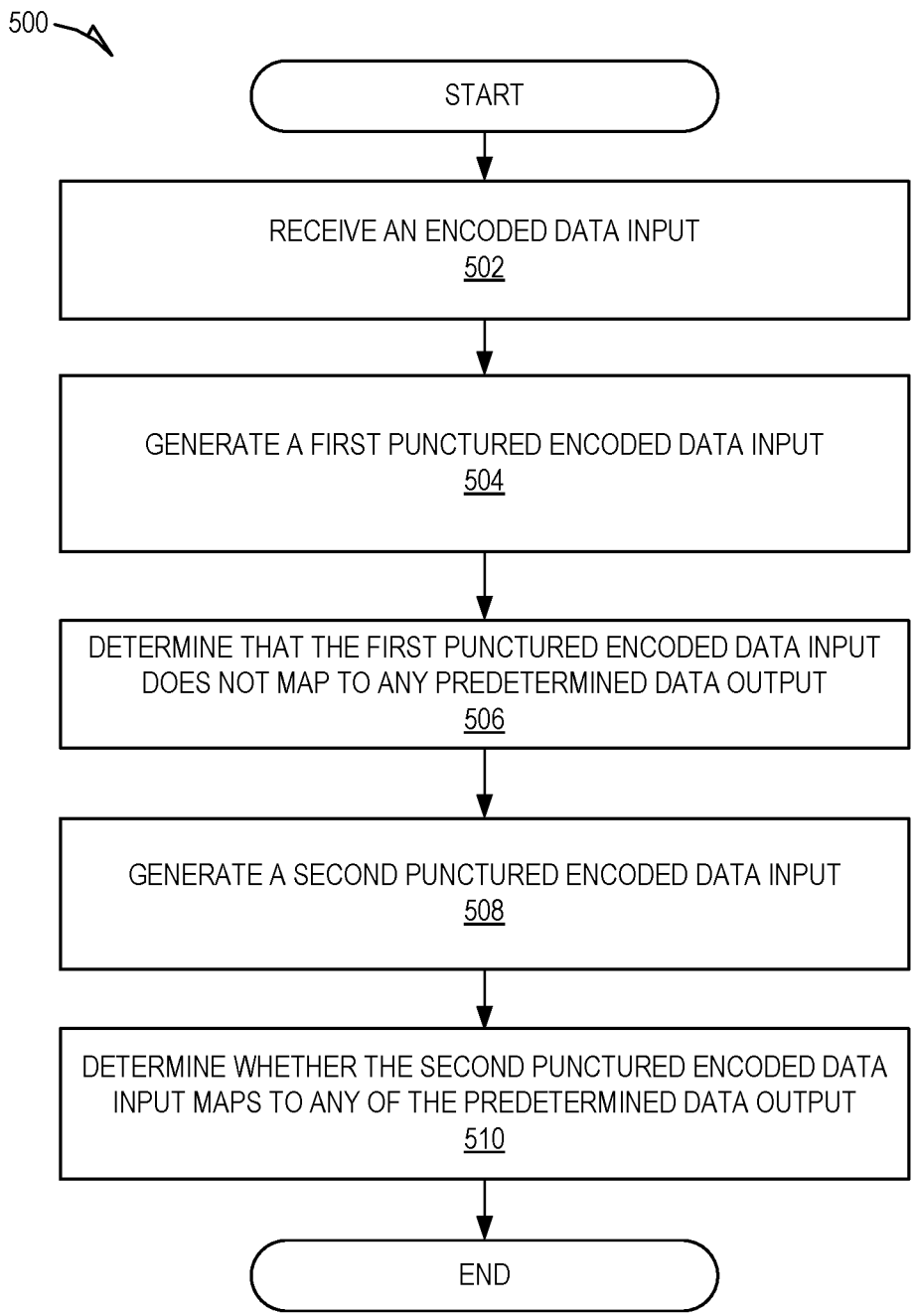
FIG. 5 is a flowchart showing another example method for improved data transmissions using puncturing and error correction encoding, according to certain example embodiments.

FIG. 5 is a flowchart showing another example method for improved data transmissions using puncturing and error correction encoding, according to certain example embodiments. The method 500 may be embodied in computer readable instructions for execution by one or more processors such that the operations of the method 500 may be performed in part or in whole by the data decoder 110; accordingly, the method 500 is described below by way of example with reference thereto. However, it shall be appreciated that at least some of the operations of the method 500 may be deployed on various other hardware configurations and the method 500 is not intended to be limited to the data decoder 110.

At operation 502, the input module 202 receives an encoded data input. The input module 202 receives the encoded data input from the transmitting device 102. The encoded data input is encoded by a data encoder 108 at the transmitting device 102 prior to transmission to the receiving device 104. The data encoder uses error correction encoding (e.g., FEC) to add redundancy to the data input. For example, the data encoder 108 may add redundancy by repeating some or all of the individual values included in the data input. The resulting encoded data input is an ordered set of individual values that includes more individual values than the original data input.

At operation 504, the puncturing module 208 generates a first punctured encoded data input. Puncturing the encoded data input includes removing one or more of the individual values included in the encoded data input. Accordingly, the first punctured encoded data input includes a subset of the individual values from the encoded data input. The puncturing module 208 may select the individual values to remove from the encoded data input at random.

At operation 506, the output mapping module 204 determines that the first punctured encoded data input does not map to any predetermined data outputs. The output mapping module 204 may attempt to map the punctured encoded data input to one of the predetermined data outputs using a known decoding technique, such as a decoding technique that corresponds to the error correction encoding technique used by the data encoder 108 to generate the encoded data input.

At operation 508, the puncturing module 208 generates a second punctured encoded data input. For example, the puncturing module 208 may remove a different one or more of the individual values included in the encoded data input. Accordingly, the second punctured encoded data input includes a subset of the individual values from the encoded data input, however the subset of individual values included in the second punctured encoded data input is different than the subset of individual values included in the first punctured encoded data input. The puncturing module 208 may select the individual values to remove from the encoded data input at random.

At operation 510, the output mapping module 204 determines whether the second punctured encoded data input maps to any predetermined data outputs.

The data decoder 110 may repeat the process of puncturing the encoded data input and attempting to map the resulting punctured encoded data input to a data output multiple times (e.g., until the resulting punctured encoded data input can be successfully mapped to a data output and/or until a threshold period of time has elapsed). Additionally, the data decoder 110 may perform this process sequentially or in parallel. For example, the data decoder 110 may perform the puncturing/mapping process sequentially such that the puncturing/mapping process is repeated in response to determining that a previously punctured encoded data cannot be mapped to any of the data outputs. Alternatively, the puncturing/mapping process may be performed concurrently such that the data decoder 110 generates multiple punctured encoded data inputs from an encoded data input and/or attempts to map the multiple punctured encoded data inputs to a data output at least partially at the same time.

Software Architecture

Figure 6:
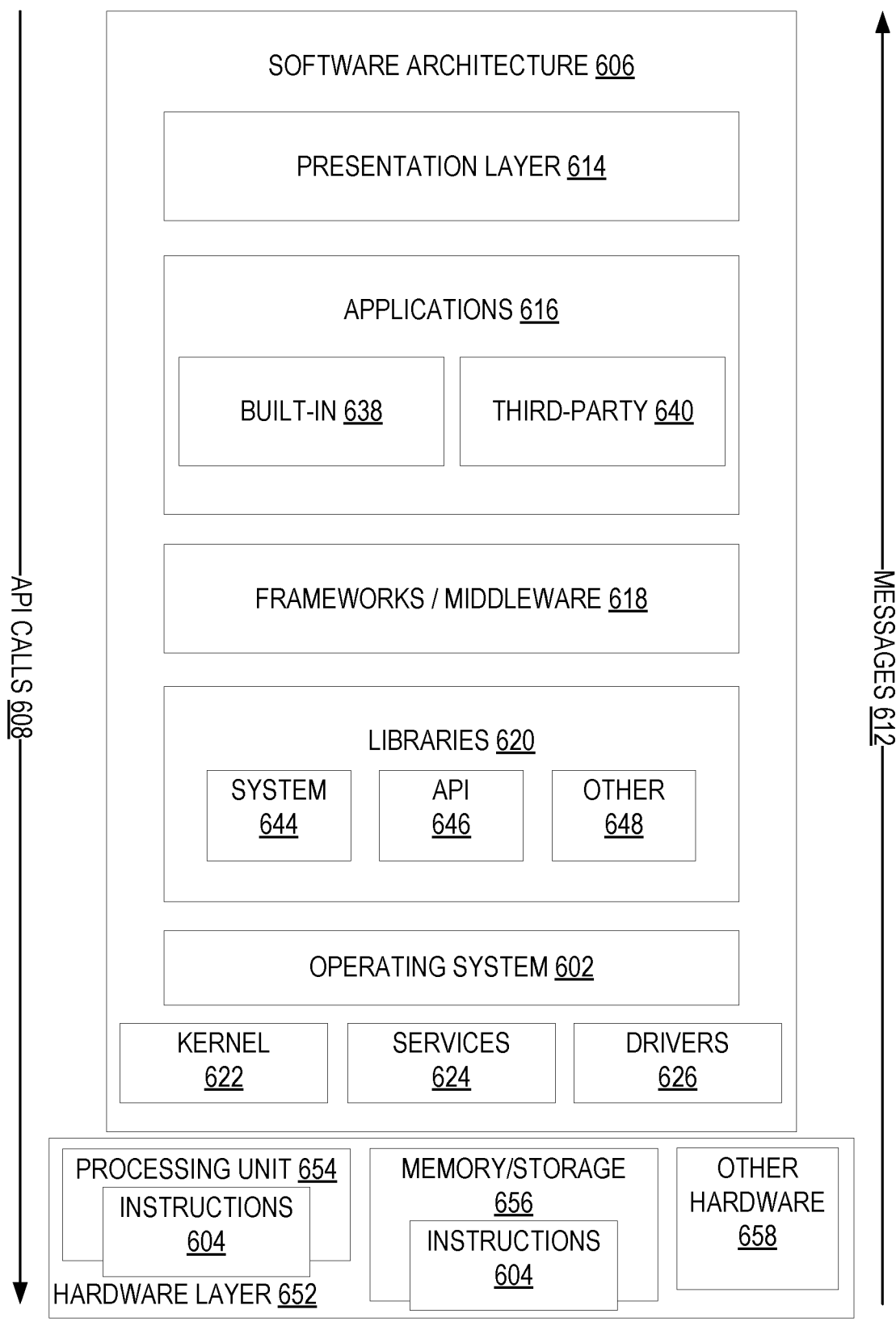
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
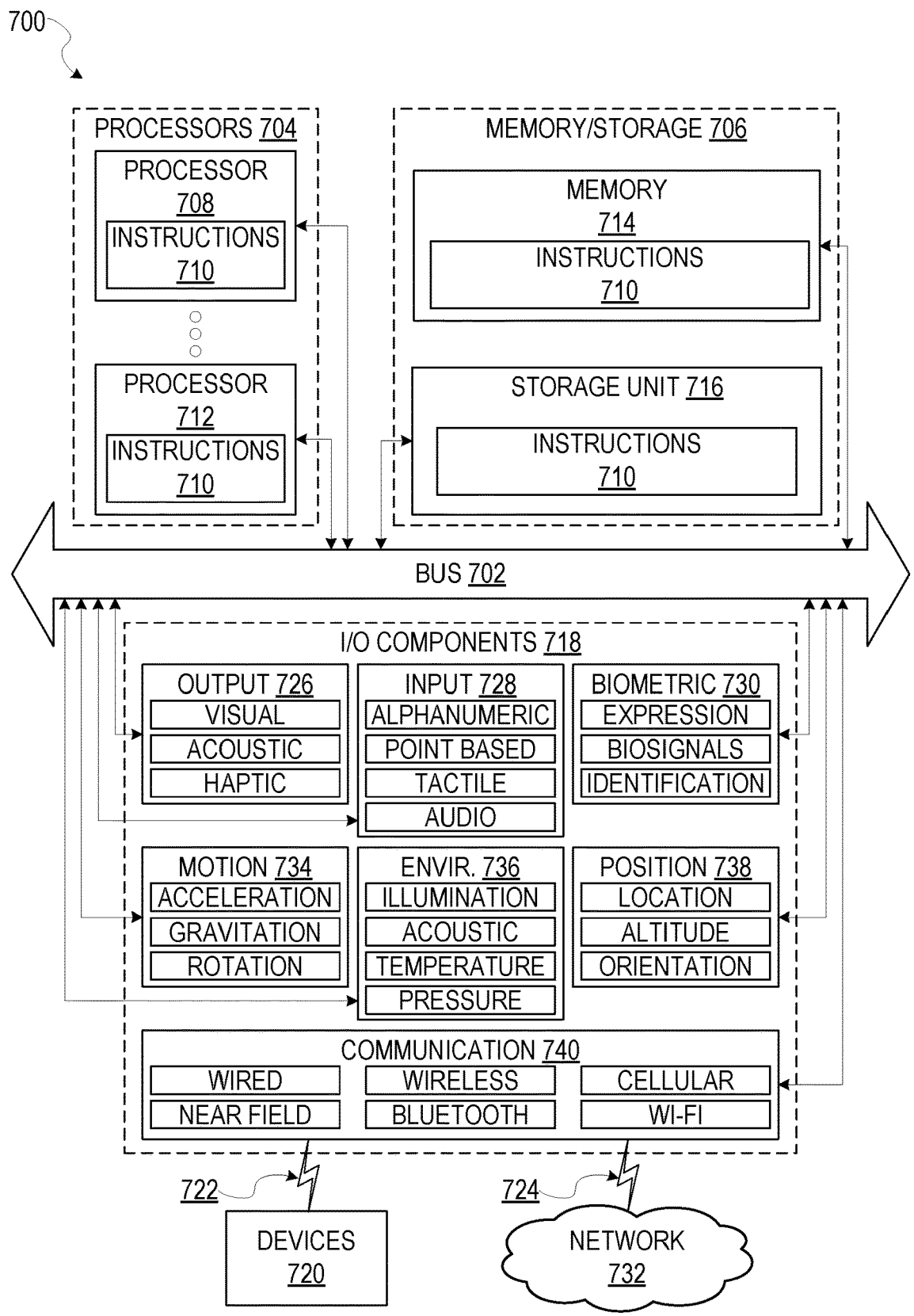
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method performed by a data decoder implemented on a receiving computing device, the method comprising:

receiving, from a transmitting computing device, an encoded data input, the received encoded data input including a set of individual values;

determining a number of values included in the set of individual values;

comparing the number of values included in the set of individual values to a threshold number, yielding a comparison;

in response to determining, based on the comparison, that the number of values included in the set of individual values exceeds the threshold number, performing a first puncturing of the received encoded data input by removing at least one individual value from the set of individual values, the first puncturing yielding a first punctured encoded data input including a reduced number of individual values that does not exceed the threshold number, the first punctured encoded data input including a first subset of the individual values from the set of individual values;

determining whether the first punctured encoded data input maps to any predetermined data outputs from a set of predetermined data outputs; and in response to determining that the first punctured encoded data input maps to a first predetermined data output from the set of predetermined data outputs, determining that the received encoded data input corresponds to the first predetermined data output.

2. The method of claim 1, wherein the received encoded data input is encoded by a data encoder using forward error correction.

3. The method of claim 1, further comprising:

performing a second puncturing of the received encoded data input, the second puncturing yielding a second punctured encoded data input, the second punctured encoded data input including a second subset of the individual values from the set of individual values;

determining whether the second punctured encoded data input maps to any predetermined data outputs from the set of predetermined data outputs; and in response to determining that the second punctured encoded data input maps to a second predetermined data output from the set of predetermined data outputs, determining that the received encoded data input corresponds to the second predetermined data output.

4. The method of claim 3, wherein the second puncturing is performed when the first punctured encoded data input does not map to any predetermined data outputs from the set of predetermined data outputs.

5. The method of claim 3, wherein the second puncturing is performed at least partially concurrently to the first puncturing.

6. The method of claim 3, wherein performing the second puncturing comprises:

removing at least a second individual value from the set of individual values included in the received encoded data input, yielding the second subset of the individual values from the set of individual values, wherein the at least the second individual value from the set of individual values is selected at random.

7. The method of claim 1, further comprising:

in response to determining that the first punctured encoded data input does not map to any predetermined data outputs from the set of predetermined data outputs, determining whether a threshold period of time has elapsed since the received encoded data input was accessed; and in response to determining that the threshold period of time has elapsed since the received encoded data input was accessed, accessing a subsequent encoded data input, wherein the received encoded data input is not determined to correspond to any of the predetermined data outputs from the set of predetermined data outputs.

8. The method of claim 1, wherein the transmitting computing device is an Internet of Things (IoT) device and the set of predetermined data outputs are data for synchronizing data transmissions from the IoT device.

9. The method of claim 1, wherein determining whether the first punctured encoded data input maps to any predetermined data outputs from the set of predetermined data outputs comprises:
- determining a similarity metric based on the first punctured data input and the first predetermined data output; and
- determining whether the similarity metric meets or exceeds a threshold similarity value.

10. The method of claim 1, further comprising:
- receiving, from the transmitting computing device, a second encoded data input including a second set of individual values; and
- in response to determining that a number of values included in the second set of individual values is less than the threshold number, determining whether the second encoded data input maps to any of the predetermined data outputs from the set of predetermined data outputs.

11. A system comprising:
one or more computer processors; and
one or more computer-readable mediums storing instructions that, when executed by the one or more computer processors, cause the system to perform operations comprising:
- receiving, from a transmitting computing device, an encoded data input, the received encoded data input including a set of individual values;
- determining a number of values included in the set of individual values;
- comparing the number of values included in the set of individual values to a threshold number, yielding a comparison;
- in response to determining, based on the comparison, that the number of values included in the set of individual values exceeds the threshold number, performing a first puncturing of the received encoded data input by removing at least one individual value from the set of individual values, the first puncturing yielding a first punctured encoded data input including a reduced number of individual values that does not exceed the threshold number, the first punctured encoded data input including a first subset of the individual values from the set of individual values;
- determining whether the first punctured encoded data input maps to any predetermined data outputs from a set of predetermined data outputs; and
- in response to determining that the first punctured encoded data input maps to a first predetermined data output from the set of predetermined data outputs, determining that the received encoded data input corresponds to the first predetermined data output.

12. The system of claim 11, wherein the received encoded data input is encoded by a data encoder using forward error correction.

13. The system of claim 11, the operations further comprising:
- performing a second puncturing of the received encoded data input, the second puncturing yielding a second punctured encoded data input, the second punctured encoded data input including a second subset of the individual values from the set of individual values;
- determining whether the second punctured encoded data input maps to any predetermined data outputs from the set of predetermined data outputs; and
- in response to determining that the second punctured encoded data input maps to a second predetermined data output from the set of predetermined data outputs, determining that the received encoded data input corresponds to the second predetermined data output.

14. The system of claim 13, wherein the second puncturing is performed when the first punctured encoded data input does not map to any predetermined data outputs from the set of predetermined data outputs.

15. The system of claim 13, wherein the second puncturing is performed at least partially concurrently to the first puncturing.

16. The system of claim 13, wherein performing the second puncturing comprises:
- removing at least a second individual value from the set of individual values included in the received encoded data input, yielding the second subset of the individual values from the set of individual values, wherein the at least the second individual value from the set of individual values is selected at random.

17. The system of claim 11, the operations further comprising:
- receiving, from the transmitting computing device, a second encoded data input including a second set of individual values; and
- in response to determining that a number of values included in the second set of individual values is less than the threshold number, determining whether the second encoded data input maps to any of the predetermined data outputs from the set of predetermined data outputs.

18. A non-transitory computer-readable medium storing instructions that, when executed by one or more computer processors of a computing system, cause the computing system to perform operations comprising:
- receiving, from a transmitting computing device, an encoded data input, the received encoded data input including a set of individual values;
- determining a number of values included in the set of individual values;
- comparing the number of values included in the set of individual values to a threshold number, yielding a comparison;
- in response to determining, based on the comparison, that the number of values included in the set of individual values exceeds the threshold number, performing a first puncturing of the received encoded data input by removing at least one individual value from the set of individual values, the first puncturing yielding a first punctured encoded data input including a reduced number of individual values that does not exceed the threshold number, the first punctured encoded data input including a first subset of the individual values from the set of individual values;
- determining whether the first punctured encoded data input maps to any predetermined data outputs from a set of predetermined data outputs; and
- in response to determining that the first punctured encoded data input maps to a first predetermined data output from the set of predetermined data outputs, determining that the received encoded data input corresponds to the first predetermined data output.

19. The non-transitory computer-readable medium of claim 18, the operations further comprising:
   receiving, from the transmitting computing device, a second encoded data input including a second set of individual values; and
   in response to determining that a number of values included in the second set of individual values is less than the threshold number, determining whether the second encoded data input maps to any of the predetermined data outputs from the set of predetermined data outputs.

\* \* \* \* \*